(12) United States Patent
Kreuscher et al.

(10) Patent No.: US 12,099,893 B2
(45) Date of Patent: Sep. 24, 2024

(54) DEVICE ASSIGNMENT SYSTEM AND METHOD

(71) Applicants: S.C.R. (ENGINEERS) LIMITED, Netanya (IL); Allflex USA LLC, DFW Airport, TX (US)

(72) Inventors: Brandt Kreuscher, DFW Airport, TX (US); Amir Cohen, Netanya (IL); Guy Fridkovski, Netanya (IL); Tzvi Shterenberg, Netanya (IL); Alon Fichman, Netanya (IL); Arthur Rabinovitz, Netanya (IL)

(73) Assignees: S.C.R. (ENGINEERS) LIMITED, Netanya (IL); ALLFLEX USA LLC, DFW Airport, TX (US)

( * ) Notice: Subject to any disclaimer, the term of this patent is extended or adjusted under 35 U.S.C. 154(b) by 0 days.

(21) Appl. No.: 18/002,486

(22) PCT Filed: Jun. 9, 2021

(86) PCT No.: PCT/IL2021/050688
§ 371 (c)(1),
(2) Date: Dec. 20, 2022

(87) PCT Pub. No.: WO2022/003666
PCT Pub. Date: Jan. 6, 2022

(65) Prior Publication Data
US 2023/0244886 A1 Aug. 3, 2023

(30) Foreign Application Priority Data
Jul. 1, 2020 (IL) .......................................... 275812

(51) Int. Cl.
*G06K 7/10* (2006.01)
*A01K 11/00* (2006.01)

(52) U.S. Cl.
CPC ........ *G06K 7/10366* (2013.01); *A01K 11/006* (2013.01)

(58) Field of Classification Search
CPC ........... G06K 19/07762; G06K 19/145; G06K 7/10366; G06K 7/10445; G06K 7/1097;
(Continued)

(56) References Cited

U.S. PATENT DOCUMENTS

| 85,575 | A | 4/1869 | Marsden |
| 1,016,752 | A | 2/1912 | Leith |

(Continued)

FOREIGN PATENT DOCUMENTS

| AU | 199534570 | 10/1994 |
| AU | 2003239832 | 5/2002 |

(Continued)

OTHER PUBLICATIONS

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.
(Continued)

*Primary Examiner* — Daniel I Walsh
(74) *Attorney, Agent, or Firm* — SHALEV, JENCMEN & CO

(57) ABSTRACT

A tag assignment system, comprising a processing circuitry and being communicatively connected to a data repository comprising records, each of which (i) being associated with a respective distinct animal of a plurality of animals, and (ii) including a Unique Animal Identifier (UAI) associated with the respective distinct animal; the processing circuitry is configured to: substantially simultaneously: (i) obtain an ID reading of an animal identification tag attached to a given animal of the animals from a first tag reading device,
(Continued)

wherein the ID reading including the UAI uniquely identifying the given animal, and (ii) obtain a tag reading of a second tag attached to the given animal from a second tag reading device, the tag reading including tag identification information uniquely identifying the second tag; and cause update of the data repository to assign the tag identification information to a given record of the records associated with the UAI.

20 Claims, 3 Drawing Sheets

(58) Field of Classification Search
CPC ............. A01K 11/006; A01K 11/004; A01K 11/0001; A01K 11/00
See application file for complete search history.

(56) References Cited

U.S. PATENT DOCUMENTS

| | | |
|---|---|---|
| 1,188,510 A | 6/1916 | Timson |
| 1,364,137 A | 1/1921 | Pannier |
| 1,759,400 A | 5/1930 | Hobbs |
| 1,843,314 A | 2/1932 | Berntson et al. |
| 1,863,037 A | 6/1932 | Archbold |
| 2,078,827 A | 4/1937 | Ashton |
| 2,420,020 A | 5/1947 | Snell |
| 2,553,400 A | 5/1951 | Blair |
| 2,570,048 A | 10/1951 | Cooke et al. |
| 3,091,770 A | 6/1963 | McMurray et al. |
| 3,261,243 A | 7/1966 | Ellison |
| 3,596,541 A | 8/1971 | Bieganski |
| 3,812,859 A | 5/1974 | Murphy et al. |
| 3,884,100 A | 5/1975 | Fideldy |
| 3,981,209 A | 9/1976 | Caroff |
| 4,120,303 A | 10/1978 | Villa-Massone et al. |
| 4,121,591 A | 10/1978 | Hayes |
| 4,281,657 A | 8/1981 | Ritchey |
| 4,323,183 A | 4/1982 | Duchin |
| 4,497,321 A | 2/1985 | Fearing et al. |
| 4,516,577 A | 5/1985 | Scott et al. |
| 4,531,520 A | 7/1985 | Reggers et al. |
| 4,552,147 A | 11/1985 | Gardner |
| 4,666,436 A | 5/1987 | McDonald et al. |
| 4,672,966 A | 6/1987 | Haas, Jr. |
| 4,696,119 A | 9/1987 | Howe et al. |
| 4,716,899 A | 1/1988 | Huenefeld et al. |
| 4,819,639 A | 4/1989 | Gardner |
| 4,821,683 A | 4/1989 | Veldman |
| 4,943,294 A | 7/1990 | Knapp |
| 5,022,253 A | 6/1991 | Parlatore |
| 5,056,385 A | 10/1991 | Petersen |
| 5,141,514 A | 8/1992 | van Amelsfort |
| 5,154,721 A | 10/1992 | Perez |
| 5,267,464 A | 12/1993 | Cleland |
| 5,509,291 A | 4/1996 | Nilsson et al. |
| 5,651,791 A | 7/1997 | Zavlodaver et al. |
| 5,778,820 A | 7/1998 | van der Lely et al. |
| 6,007,548 A | 12/1999 | Ritchey |
| 6,016,769 A | 1/2000 | Forster |
| 6,043,748 A | 3/2000 | Touchton et al. |
| 6,053,926 A | 4/2000 | Luehrs |
| 6,095,915 A | 8/2000 | Battista et al. |
| 6,099,482 A | 8/2000 | Brune et al. |
| 6,100,804 A | 8/2000 | Brady et al. |
| 6,113,539 A | 9/2000 | Ridenour |
| 6,114,957 A | 9/2000 | Westrick et al. |
| 6,145,225 A | 11/2000 | Ritchey |
| 6,166,643 A | 12/2000 | Janning et al. |
| 6,172,640 B1 | 1/2001 | Durst et al. |
| 6,232,880 B1 | 5/2001 | Anderson et al. |
| 6,235,036 B1 | 5/2001 | Gardner et al. |
| 6,271,757 B1 | 8/2001 | Touchton et al. |
| 6,297,739 B1 | 10/2001 | Small |
| 6,310,553 B1 | 10/2001 | Dance |
| 6,402,692 B1 | 6/2002 | Morford |
| 6,497,197 B1 | 12/2002 | Huisma |
| 6,502,060 B1 | 12/2002 | Christian |
| 6,510,630 B1 | 1/2003 | Gardner |
| 6,535,131 B1 | 3/2003 | Bar-Shalom et al. |
| 6,569,092 B1 | 5/2003 | Guichon et al. |
| 6,659,039 B1 | 12/2003 | Larsen |
| 6,868,804 B1 | 3/2005 | Huisma et al. |
| 7,016,730 B2 | 3/2006 | Ternes |
| 7,046,152 B1 | 5/2006 | Peinetti et al. |
| 7,137,359 B1 | 11/2006 | Braden |
| 7,296,539 B2 | 11/2007 | Iljas |
| 7,380,518 B2 | 6/2008 | Kates |
| 7,705,736 B1 | 4/2010 | Kedziora |
| 7,772,979 B2 | 8/2010 | Reinhard |
| 7,843,350 B2 | 11/2010 | Geissler et al. |
| 7,937,861 B1 | 5/2011 | Zacher |
| 8,005,624 B1 | 8/2011 | Starr |
| 8,260,948 B2 * | 9/2012 | Chand ................. G06Q 30/06 340/10.2 |
| 8,266,990 B1 | 9/2012 | Janson |
| 8,305,220 B2 | 11/2012 | Gibson |
| 8,478,389 B1 | 7/2013 | Brockway et al. |
| 8,622,929 B2 | 1/2014 | Wilson et al. |
| 8,763,557 B2 | 7/2014 | Lipscomb et al. |
| 8,955,462 B1 | 2/2015 | Golden et al. |
| 9,215,862 B2 | 12/2015 | Bladen et al. |
| 9,392,767 B2 | 7/2016 | Talt et al. |
| 9,392,946 B1 | 7/2016 | Sarantos et al. |
| 9,449,487 B1 | 9/2016 | Spitalny |
| 9,648,849 B1 | 5/2017 | Vivathana |
| 9,654,925 B1 | 5/2017 | Solinsky et al. |
| 9,693,536 B1 | 7/2017 | Dana |
| 9,717,216 B1 | 8/2017 | Schlachta et al. |
| 9,743,643 B1 | 8/2017 | Kaplan et al. |
| 9,848,577 B1 | 12/2017 | Brandao et al. |
| 9,861,080 B1 | 1/2018 | Hathway et al. |
| 10,021,857 B2 | 7/2018 | Bailey et al. |
| 10,039,263 B2 | 8/2018 | Teychene et al. |
| 10,045,511 B1 | 8/2018 | Yarden et al. |
| 10,064,391 B1 | 9/2018 | Riley |
| 10,091,972 B1 | 10/2018 | Jensen et al. |
| 10,231,442 B1 | 3/2019 | Chang et al. |
| 10,242,547 B1 | 3/2019 | Struhsaker et al. |
| 10,264,762 B1 | 4/2019 | Lamb |
| 10,291,690 B1 * | 5/2019 | Barrueto ................. H04L 69/08 |
| 10,352,759 B1 | 7/2019 | Jensen |
| 10,446,006 B1 | 10/2019 | Johnson, Jr. et al. |
| 10,512,430 B1 | 12/2019 | Hladio |
| 10,588,295 B1 | 3/2020 | Riley |
| 10,628,756 B1 | 4/2020 | Kuper et al. |
| 10,638,726 B1 | 5/2020 | Makarychev et al. |
| 10,691,674 B2 | 6/2020 | Leong et al. |
| 2001/0027751 A1 | 10/2001 | van den Berg |
| 2002/0010390 A1 | 1/2002 | Guice et al. |
| 2002/0021219 A1 | 2/2002 | Edwards |
| 2002/0091326 A1 | 7/2002 | Hashimoto et al. |
| 2002/0095828 A1 | 7/2002 | Koopman et al. |
| 2002/0154015 A1 | 10/2002 | Hixson |
| 2002/0158765 A1 | 10/2002 | Pape et al. |
| 2003/0004652 A1 | 1/2003 | Brunner et al. |
| 2003/0023517 A1 | 1/2003 | Marsh et al. |
| 2003/0062001 A1 | 4/2003 | Hakan |
| 2003/0066491 A1 | 4/2003 | Stampe |
| 2003/0144926 A1 | 7/2003 | Bodin et al. |
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson et al. |
| 2003/0221343 A1 | 12/2003 | Volk et al. |
| 2003/0229452 A1 | 12/2003 | Lewis |
| 2004/0066298 A1 | 4/2004 | Schmitt et al. |
| 2004/0078390 A1 | 4/2004 | Saunders |
| 2004/0118920 A1 | 6/2004 | He |
| 2004/0119831 A1 * | 6/2004 | Miyawaki ......... G06K 17/0022 707/E17.026 |
| 2004/0123810 A1 | 7/2004 | Lorton et al. |

(56) References Cited

U.S. PATENT DOCUMENTS

| | | |
|---|---|---|
| 2004/0177011 A1 | 9/2004 | Ramsay et al. |
| 2004/0201454 A1 | 10/2004 | Waterhouse et al. |
| 2005/0010333 A1 | 1/2005 | Lorton et al. |
| 2005/0026181 A1 | 2/2005 | Davis et al. |
| 2005/0097997 A1 | 5/2005 | Hile |
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0210267 A1* | 9/2005 | Sugano ............... H04W 12/069 713/186 |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |
| 2006/0173367 A1 | 8/2006 | Stuart et al. |
| 2006/0185605 A1 | 8/2006 | Renz et al. |
| 2006/0201436 A1 | 9/2006 | Kates |
| 2006/0207515 A1 | 9/2006 | Palett |
| 2006/0241521 A1 | 10/2006 | Cohen |
| 2006/0261928 A1* | 11/2006 | Solberg ............... H04L 9/40 340/572.4 |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost et al. |
| 2007/0021660 A1 | 1/2007 | DeLonzor et al. |
| 2007/0027375 A1 | 2/2007 | Melker et al. |
| 2007/0027377 A1 | 2/2007 | DeLonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0103314 A1* | 5/2007 | Geissler ............... A01K 11/006 340/573.1 |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson et al. |
| 2008/0146890 A1 | 6/2008 | LeBoeuf et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0113902 A1 | 5/2010 | Hete et al. |
| 2010/0139575 A1 | 6/2010 | Duncan et al. |
| 2010/0160809 A1* | 6/2010 | Laurence ............... A01K 29/005 604/890.1 |
| 2010/0164687 A1* | 7/2010 | Perng ................... G06K 7/0008 340/10.1 |
| 2010/0175625 A1 | 7/2010 | Klenotiz |
| 2010/0180824 A1* | 7/2010 | Bright ................... A01K 29/00 119/14.08 |
| 2010/0217102 A1 | 8/2010 | LeBoeuf et al. |
| 2010/0250198 A1 | 9/2010 | Lorton et al. |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Afikim et al. |
| 2011/0018717 A1 | 1/2011 | Takahashi et al. |
| 2011/0041367 A1 | 2/2011 | Bladen et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0068848 A1 | 3/2012 | Campbell et al. |
| 2012/0089152 A1 | 4/2012 | Lynd et al. |
| 2012/0089340 A1* | 4/2012 | Huisma ............... G01G 19/4146 702/19 |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0046170 A1 | 2/2013 | Haynes |
| 2013/0113622 A1 | 5/2013 | Pratt et al. |
| 2013/0119142 A1 | 5/2013 | McCoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0285815 A1 | 10/2013 | Jones, II |
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |

(56) References Cited

U.S. PATENT DOCUMENTS

| | | |
|---|---|---|
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | McLaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0201587 A1* | 7/2015 | Brayer .................. A01K 1/0029 119/769 |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351365 A1* | 12/2015 | Claver Tallón ....... A01K 11/006 235/380 |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0004953 A1* | 1/2016 | Karani ............. G06K 19/07758 235/492 |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | Siegel |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0006838 A1* | 1/2017 | Brayer ............... G05B 19/4155 |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil et al. |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0131074 A1 | 5/2018 | Wilkinson et al. |
| 2018/0132455 A1 | 5/2018 | Pradeep et al. |
| 2018/0146645 A1* | 5/2018 | Arbel .................. A01K 11/006 |
| 2018/0206448 A1* | 7/2018 | Madhusudan ....... A01K 5/0275 |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco et al. |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1* | 6/2019 | Betts-LaCroix ..... G06K 7/1417 |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2019/0387711 A1* | 12/2019 | Flennert ............... A01K 29/005 |
| 2020/0015740 A1 | 1/2020 | Alnofeli et al. |

(56) References Cited

U.S. PATENT DOCUMENTS

| | | | |
|---|---|---|---|
| 2020/0037886 | A1 | 2/2020 | Greer et al. |
| 2020/0068853 | A1 | 3/2020 | Radovcic |
| 2020/0085019 | A1 | 3/2020 | Gilbert et al. |
| 2020/0100463 | A1 | 4/2020 | Rooda et al. |
| 2020/0107522 | A1 | 4/2020 | Kersey et al. |
| 2020/0110946 | A1 | 4/2020 | Kline et al. |
| 2020/0113728 | A1 | 4/2020 | Spector et al. |
| 2020/0170222 | A1 | 6/2020 | Gotts |
| 2020/0178505 | A1 | 6/2020 | Womble et al. |
| 2020/0178800 | A1* | 6/2020 | Geissler .......... H04W 4/029 |
| 2020/0205381 | A1 | 7/2020 | Wernimont et al. |
| 2020/0229391 | A1* | 7/2020 | De Groot .......... A01K 7/02 |
| 2020/0229707 | A1 | 7/2020 | Donnelly |
| 2020/0242551 | A1 | 7/2020 | Lau et al. |
| 2022/0330522 | A1* | 10/2022 | Wang .......... A01K 29/005 |
| 2022/0369593 | A1* | 11/2022 | Vogels .......... A01K 29/005 |
| 2023/0129369 | A1* | 4/2023 | Womble .......... H04N 7/185 |
| | | | 119/859 |
| 2023/0244886 | A1* | 8/2023 | Kreuscher .......... G06K 7/10366 |
| | | | 235/380 |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 202013011075 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |

(56) References Cited

FOREIGN PATENT DOCUMENTS

| | | |
|---|---|---|
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 9/2016 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 101747418 | 1/2011 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 101896868 B1 | 9/2018 |
| KR | 2018109451 | 10/2018 |
| KR | 20190081598 | 7/2019 |
| KR | 2019091708 | 8/2019 |
| KR | 20200009450 A | 1/2020 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 1999045761 A1 | 9/1999 |
| WO | 2000013393 | 3/2000 |
| WO | 2000061802 | 10/2000 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005104930 | 4/2005 |
| WO | 2005073408 | 8/2005 |
| WO | 2005082132 A2 | 9/2005 |
| WO | 2006021855 | 3/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 2008033042 | 3/2008 |
| WO | 2008041839 A | 4/2008 |
| WO | 2008052298 | 5/2008 |
| WO | 2008075974 | 6/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |

(56) References Cited

FOREIGN PATENT DOCUMENTS

| WO | 2015175686 | | 11/2015 |
|---|---|---|---|
| WO | 2015176027 | | 11/2015 |
| WO | 2015197385 | | 12/2015 |
| WO | 2016037190 | | 3/2016 |
| WO | 2017149049 | | 3/2016 |
| WO | 2016053104 | | 4/2016 |
| WO | 2016108187 | | 7/2016 |
| WO | 2016166748 | | 10/2016 |
| WO | 2017001538 | | 1/2017 |
| WO | 2017027551 | | 2/2017 |
| WO | 2017037479 | | 3/2017 |
| WO | 2017066813 | | 4/2017 |
| WO | 2017089289 | | 6/2017 |
| WO | 2017096256 | | 6/2017 |
| WO | 2017121834 | | 7/2017 |
| WO | 2017136897 | A1 | 8/2017 |
| WO | 2018006965 | | 1/2018 |
| WO | 2018011736 | | 1/2018 |
| WO | 2018019742 | | 2/2018 |
| WO | 2020022543 | | 7/2018 |
| WO | 2018172976 | | 9/2018 |
| WO | 2020060248 | | 9/2018 |
| WO | 2018203203 | | 11/2018 |
| WO | 2019009717 | | 1/2019 |
| WO | 2019025138 | | 2/2019 |
| WO | 2019046216 | | 3/2019 |
| WO | 2019048521 | A | 3/2019 |
| WO | 2019058752 | | 3/2019 |
| WO | 2019071222 | | 4/2019 |
| WO | 2019132803 | | 7/2019 |
| WO | 2019207561 | | 10/2019 |
| WO | 2019235942 | | 12/2019 |
| WO | 2019245978 | | 12/2019 |
| WO | 2020003310 | | 1/2020 |
| WO | 2020096528 | | 5/2020 |
| WO | 2020140013 | | 7/2020 |

OTHER PUBLICATIONS

Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, the Journal of Dairy Research; Cambridge vol. 84, Iss. 2, (May 2017): 132-138.

Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, the Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.

N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.

The role of sensors, big data and machine learning in modern animal farming; Suresh Neethirajan; Accepted Jul. 3, 2020 Sensing and Bio-Sensing Research 29 (2020) 100367 2214-1804/ © 2020 the Author. Published by Elsevier B.V.

A Review on Determination of Computer Aid Diagnosis and/or Risk Factors Using Data Mining Methods in Veterinary Field Pnar Cİhan, Erhan Göçke, Oya Kalipsiz; Tekirda Namk Kemal University, Çorlu Faculty of Engineering, Department of Computer Engineering, Tekirdağ, Turkey. 2019.

Big Data Analytics and Precision Animal Agriculture Symposium: Data to decisions B. J. White, D. E. Amrine, and R. L. Larson Beef Cattle Institute, Kansas State University, Manhattan, KS; © the Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.

Drying up Cows and the Effect of Different Methods Upon Milk Production; Ralph Wayne, C. H. Eckles, and W. E. Peterson; Division of Dairy Husbandry, University of Minnesota, St. Paul; Research-Article| vol. 16, Issue 1, p. 69-78, Jan. 1, 1933.

* cited by examiner

DEVICE ASSIGNMENT SYSTEM AND METHOD

TECHNICAL FIELD

The presently disclosed subject matter relates to animal identification and assignment of devices to animals according to the animal identification results.

BACKGROUND

Animals may be tagged for various purposes. One purpose of tagging an animal is for identification purposes. For example, an animal can be identified by an electronic identification (eID), such as an animal identification tag (also referred to herein as: "animal ID Tag" or "ID Tag") that is attached thereto, for uniquely identifying the animal. Of course, an EID tag is not the only way an animal can be identified. Animals can additionally or alternatively be identified using other systems, methods or techniques, such as non-electronic identification tags, visual identification tags, camera based identification systems, identification marks directly on animals (either of the latter three identifiers can include digits, letters, symbols, or any combination thereof, etc.), readable barcodes, facial (or other body part) recognition, etc. Identification of an animal is also important for physiological monitoring thereof. An animal can be monitored (and optionally also identified, e.g. in case the ID tag is also used for physiological monitoring) by an animal monitoring device such as a tag (also referred to herein as: "Monitoring Tag") that is designed to collect information relating to the animal's activity and health status and optionally to transmit the obtained information wirelessly to an external server. Monitoring tags may be ear tags or other types of tags, such as neck tags. It is thus naturally crucial to have the ability to identify the animal that is monitored by the monitoring tag by associating the animal (using an animal identification method, device, identifier, or system) with the monitoring tag (using an identifier thereof). In some cases, additional types of identification devices can be attached to an animal for various purposes. Including for example, tags that indicate some feature or detail about the animal's health, origin, status, etc. Such identification devices are also included in the scope of the presently disclosed subject matter.

In one example of identification systems discussed herein, current tagging systems are independent of one another and they are not automatically associated with an identifier of the animal to which they are attached. The identification tag, or any other identifier as indicated herein, identifies the animal, but the system that identifies the animal does not read the monitoring tag, and does not know to associate the animal identifier (e.g. the identifier associated with the ID tag) with the monitoring tag identifier (associated with the monitoring tag). Due to the fact that it is critical to be able to associate an animal identifier (e.g. the identifier associated with the ID tag) with the monitoring tag identifier (associated with the monitoring tag), such association is made manually. However, such manual assignment task is cumbersome, ineffective, and in some cases even impossible, especially in large farms in which hundreds, thousands, or tens of thousands of animals are grown. The task gets even more complicated due to the fact that monitoring tags (or other devices for that purpose) are reusable and may be transferred from animal to animal.

There is thus a need in the art for a new method and system for animal identifier reading, assignment, tracking, and/or correlation.

GENERAL DESCRIPTION

In accordance with a first aspect of the presently disclosed subject matter, there is provided a tag assignment system, comprising: one or more tag reading devices capable of reading tags attached to animals; and a processing circuitry; wherein: the tag assignment system is communicatively connected to a data repository comprising one or more records, each of the records (i) being associated with a respective distinct animal of a plurality of animals, and (ii) including a unique animal identifier associated with the respective distinct animal; and the processing circuitry is configured to: substantially simultaneously: (i) obtain an ID reading of an animal identification tag attached to a given animal of the animals from a first tag reading device of the tag reading devices, wherein the first tag reading device is operating according to a first communication protocol, and the ID reading including at least the unique animal identifier uniquely identifying the given animal, and (ii) obtain a tag reading of a second tag, other than the animal identification tag, attached to the given animal from a second tag reading device of the tag reading devices, wherein the second tag reading device is operating according to a second communication protocol, and the tag reading including at least tag identification information uniquely identifying the second tag attached to the given animal; and cause update of the data repository to assign the tag identification information to a given record of the records associated with the unique animal identifier of the given animal.

In one embodiment of the presently disclosed subject matter and/or embodiments thereof, the processing circuitry is further configured to cause a second update of the data repository to delete the tag identification information from a second record of the records, other than the given record, wherein the second record is not associated with the unique animal identifier of the given animal.

In one embodiment of the presently disclosed subject matter and/or embodiments thereof, the second tag is an animal monitoring tag.

In one embodiment of the presently disclosed subject matter and/or embodiments thereof, the first communication protocol is different than the second communication protocol.

In one embodiment of the presently disclosed subject matter and/or embodiments thereof, the first tag reading device is different than the second tag reading device.

In one embodiment of the presently disclosed subject matter and/or embodiments thereof, the animal identification tag is an Radio Frequency Identification (RFID) tag and the first communication protocol is an RFID protocol.

In one embodiment of the presently disclosed subject matter and/or embodiments thereof, the second tag is an Infra-Red (IR) tag and the second communication protocol is an IR protocol.

In one embodiment of the presently disclosed subject matter and/or embodiments thereof, the ID reading and the tag reading are obtained when the given animal is located at a confined area, so that (a) the animal identification tag is within a first reading range of the first tag reading device, and (b) the second tag is within a second reading range of the second tag reading device.

In one embodiment of the presently disclosed subject matter and/or embodiments thereof, the confined area is within a feeding station.

In one embodiment of the presently disclosed subject matter and/or embodiments thereof, the confined area is within a milking cabin.

In one embodiment of the presently disclosed subject matter and/or embodiments thereof, the confined area is a portion of an animal passage allowing only one of the animals to be located within the confined area during obtainment of the ID reading and the tag reading.

In one embodiment of the presently disclosed subject matter and/or embodiments thereof, the animal passage is a sorting gate.

In one embodiment of the presently disclosed subject matter and/or embodiments thereof, the confined area is an area defined by the first reading range and the second reading range.

In one embodiment of the presently disclosed subject matter and/or embodiments thereof, the animal passage comprises conductive rails, and wherein at least one of (a) the first tag reading device, or (b) the second tag reading device, are insulated from the conductive rails.

In one embodiment of the presently disclosed subject matter and/or embodiments thereof, the processing circuitry is further configured, after the substantially simultaneous obtainment, to substantially simultaneously: (a) obtain a second ID reading of the animal identification tag attached to the given animal from a third tag reading device of the tag reading devices, wherein the third tag reading device is operating according to the first communication protocol, and the second ID reading including at least the unique animal identifier uniquely identifying the given animal, and (b) obtain a second tag reading of the second tag attached to the given animal from a fourth tag reading device of the tag reading devices, wherein the fourth tag reading device is operating according to the second communication protocol, and the second tag reading including at least the tag identification information uniquely identifying the second tag attached to the given animal; and wherein causing the update of the data repository is made upon the ID reading being identical to the second ID reading and the tag reading being identical to the second tag reading.

In one embodiment of the presently disclosed subject matter and/or embodiments thereof, (a) the first tag reading device and the third tag reading device are different tag reading devices, and (b) the second tag reading device and the fourth tag reading device are different tag reading devices.

In one embodiment of the presently disclosed subject matter and/or embodiments thereof, the second ID reading and the second tag reading are obtained when the given animal is located at a second confined area other than the confined area, so that (i) the animal identification tag is within a third reading range of the second animal identification tag reading device, and (ii) the animal monitoring tag is within a fourth reading range of the second animal monitoring tag reading device.

In one embodiment of the presently disclosed subject matter and/or embodiments thereof, the processing circuitry is further configured to alert a user upon failure to obtain the ID reading or the tag reading.

In accordance with a second aspect of the presently disclosed subject matter, there is provided a tag assignment method, comprising: substantially simultaneously: (i) obtaining an ID reading of an animal identification tag attached to a given animal of the animals from a first tag reading device of one or more tag reading devices capable of reading tags attached to animals, wherein the first tag reading device is operating according to a first communication protocol, and the ID reading including at least the unique animal identifier uniquely identifying the given animal, and (ii) obtaining a tag reading of a second tag, other than the animal identification tag, attached to the given animal from a second tag reading device of the tag reading devices, wherein the second tag reading device is operating according to a second communication protocol, and the tag reading including at least tag identification information uniquely identifying the second tag attached to the given animal; and causing update of a data repository comprising one or more records, each of the records (i) being associated with a respective distinct animal of a plurality of animals, and (ii) including a unique animal identifier associated with the respective distinct animal, wherein the update includes assigning the tag identification information to a given record of the records associated with the unique animal identifier of the given animal.

In one embodiment of the presently disclosed subject matter and/or embodiments thereof, the method further comprises causing a second update of the data repository to delete the tag identification information from a second record of the records, other than the given record, wherein the second record is not associated with the unique animal identifier of the given animal.

In one embodiment of the presently disclosed subject matter and/or embodiments thereof, the second tag is an animal monitoring tag.

In one embodiment of the presently disclosed subject matter and/or embodiments thereof, the first communication protocol is different than the second communication protocol.

In one embodiment of the presently disclosed subject matter and/or embodiments thereof, the first tag reading device is different than the second tag reading device.

In one embodiment of the presently disclosed subject matter and/or embodiments thereof, the animal identification tag is an Radio Frequency Identification (RFID) tag and the first communication protocol is an RFID protocol.

In one embodiment of the presently disclosed subject matter and/or embodiments thereof, the second tag is an Infra-Red (IR) tag and the second communication protocol is an IR protocol.

In one embodiment of the presently disclosed subject matter and/or embodiments thereof, the ID reading and the tag reading are obtained when the given animal is located at a confined area, so that (a) the animal identification tag is within a first reading range of the first tag reading device, and (b) the second tag is within a second reading range of the second tag reading device.

In one embodiment of the presently disclosed subject matter and/or embodiments thereof, the confined area is within a feeding station.

In one embodiment of the presently disclosed subject matter and/or embodiments thereof, the confined area is within a milking cabin.

In one embodiment of the presently disclosed subject matter and/or embodiments thereof, the confined area is a portion of an animal passage allowing only one of the animals to be located within the confined area during obtainment of the ID reading and the tag reading.

In one embodiment of the presently disclosed subject matter and/or embodiments thereof, the animal passage is a sorting gate.

In one embodiment of the presently disclosed subject matter and/or embodiments thereof, the confined area is an area defined by the first reading range and the second reading range.

In one embodiment of the presently disclosed subject matter and/or embodiments thereof, the animal passage comprises conductive rails, and wherein at least one of (a) the first tag reading device, or (b) the second tag reading device, are insulated from the conductive rails.

In one embodiment of the presently disclosed subject matter and/or embodiments thereof, the method further comprises, after the substantially simultaneous obtainment, substantially simultaneously: (a) obtaining a second ID reading of the animal identification tag attached to the given animal from a third tag reading device of the tag reading devices, wherein the third tag reading device is operating according to the first communication protocol, and the second ID reading including at least the unique animal identifier uniquely identifying the given animal, and (b) obtaining a second tag reading of the second tag attached to the given animal from a fourth tag reading device of the tag reading devices, wherein the fourth tag reading device is operating according to the second communication protocol, and the second tag reading including at least the tag identification information uniquely identifying the second tag attached to the given animal; and wherein causing the update of the data repository is made upon the ID reading being identical to the second ID reading and the tag reading being identical to the second tag reading.

In one embodiment of the presently disclosed subject matter and/or embodiments thereof, (a) the first tag reading device and the third tag reading device are different tag reading devices, and (b) the second tag reading device and the fourth tag reading device are different tag reading devices.

In one embodiment of the presently disclosed subject matter and/or embodiments thereof, the second ID reading and the second tag reading are obtained when the given animal is located at a second confined area other than the confined area, so that (i) the animal identification tag is within a third reading range of the second animal identification tag reading device, and (ii) the animal monitoring tag is within a fourth reading range of the second animal monitoring tag reading device.

In one embodiment of the presently disclosed subject matter and/or embodiments thereof, the method further comprises alerting a user upon failure of obtaining the ID reading or the tag reading.

In accordance with a second aspect of the presently disclosed subject matter, there is provided a non-transitory computer readable storage medium having computer readable program code embodied therewith, the computer readable program code, executable by at least one processing circuitry of a computer to perform a method comprising: substantially simultaneously: (i) obtaining an ID reading of an animal identification tag attached to a given animal of the animals from a first tag reading device of one or more tag reading devices capable of reading tags attached to animals, wherein the first tag reading device is operating according to a first communication protocol, and the ID reading including at least the unique animal identifier uniquely identifying the given animal, and (ii) obtaining a tag reading of a second tag, other than the animal identification tag, attached to the given animal from a second tag reading device of the tag reading devices, wherein the second tag reading device is operating according to a second communication protocol, and the tag reading including at least tag identification information uniquely identifying the second tag attached to the given animal; and causing update of a data repository comprising one or more records, each of the records (i) being associated with a respective distinct animal of a plurality of animals, and (ii) including a unique animal identifier associated with the respective distinct animal, wherein the update includes assigning the tag identification information to a given record of the records associated with the unique animal identifier of the given animal.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
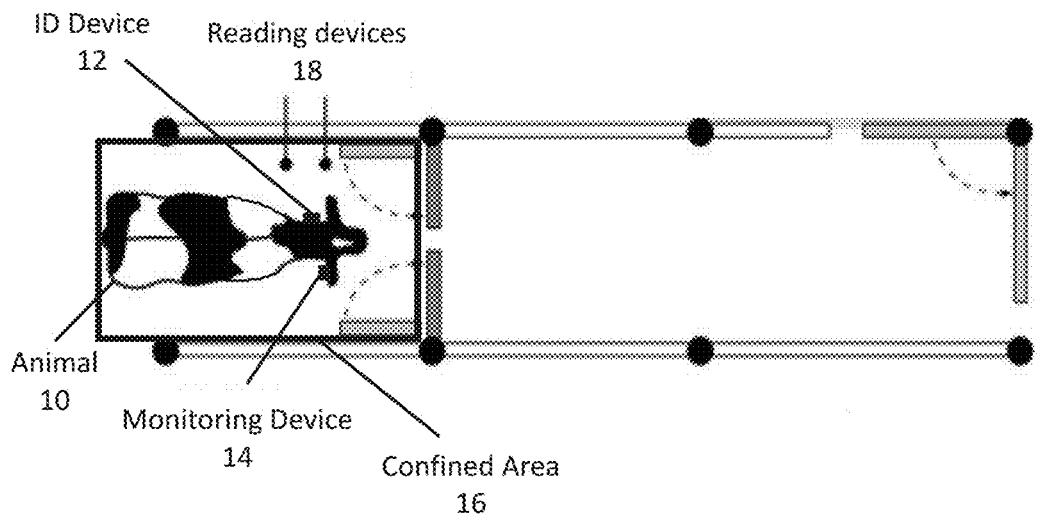
FIG. 1 is a schematic illustration of exemplary device assignment system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "causing", "updating", "alerting" or the like, include action and/or processes of a computer that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
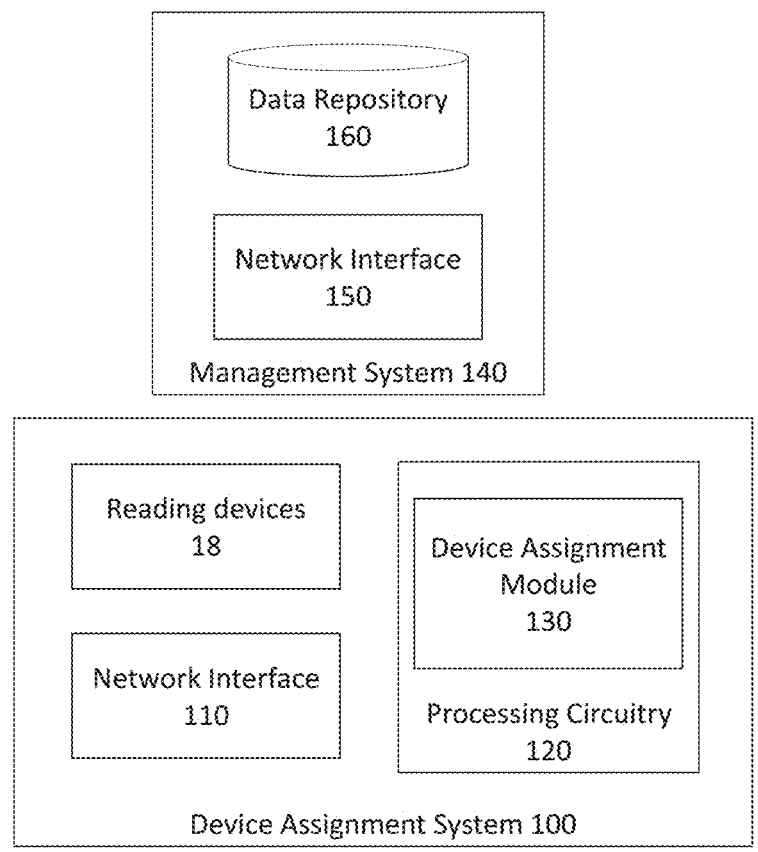
FIG. 2 is a block diagram schematically illustrating one example of a device assignment system, in accordance with the presently disclosed subject matter.
Figure 3:
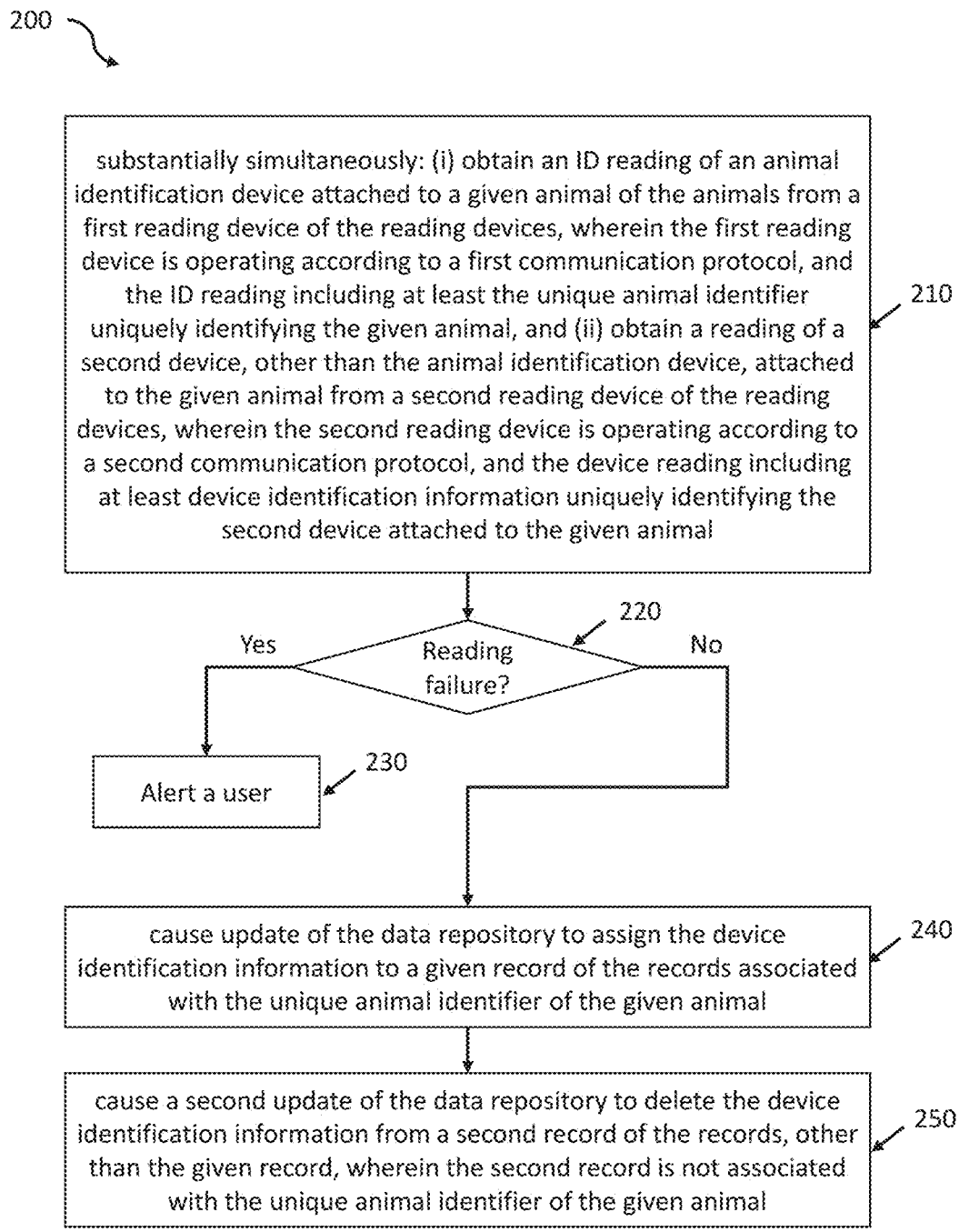
FIG. 3 is a flowchart illustrating one example of a sequence of operations carried out for device assignment, in accordance with the presently disclosed subject matter.
Figure 4:
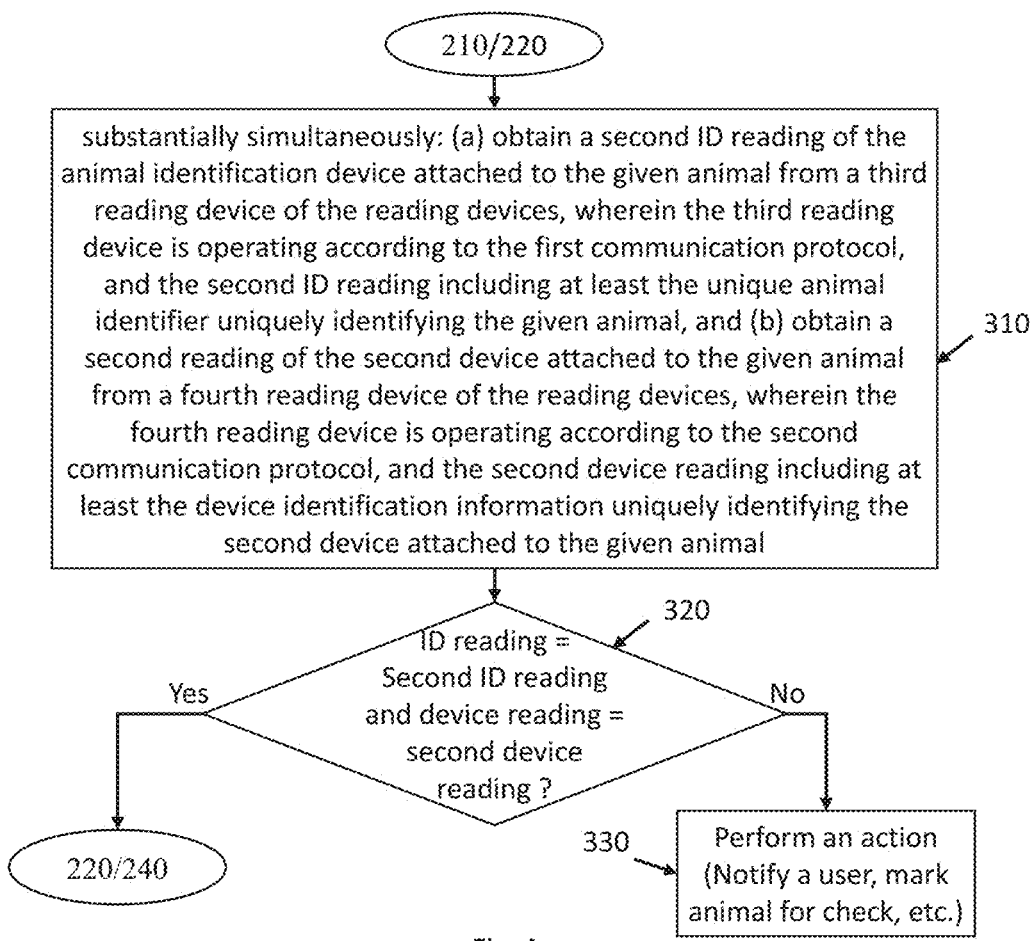
FIG. 4 is another flowchart illustrating another optional part of the sequence of operations carried out for device assignment, in accordance with the presently disclosed subject matter.

In embodiments of the presently disclosed subject matter, fewer, more and/or different stages than those shown in FIGS. 3 and 4 may be executed. In embodiments of the presently disclosed subject matter one or more stages illustrated in FIGS. 3 and 4 may be executed in a different order and/or one or more groups of stages may be executed simultaneously. FIGS. 1 and 2 illustrates a general schematic of the system architecture in accordance with an embodiment of the presently disclosed subject matter. Each module in FIGS. 1 and 2 can be made up of any combination of software, hardware and/or firmware that performs the functions as defined and explained herein. The modules in FIGS. 1 and 2 may be centralized in one location or dispersed over more than one location, as detailed herein. In other embodiments of the presently disclosed subject matter, the system may comprise fewer, more, and/or different modules than those shown in FIGS. 1 and 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of exemplary device assignment system, in accordance with the presently disclosed subject matter.

In the illustration, an animal 10 is shown. Although the animal 10 in the illustration is a cow, it is by no means limiting, and the animal 10 can be any other animal (e.g. other types of cattle, pets, fish, livestock, etc.). The animal 10 has two devices attached to it: an identification (ID) device 12 (such as, but not limited to an ID tag) and a monitoring device 14 (such as, but not limited to, a monitoring tag). As indicated herein, the ID device 12 can be a tag that uniquely identifies the animal 10. However, the ID device 12 may alternatively be another type of device used to identify the animal 10 by any of the methods or systems described herein (including electronic identification, visual identification, camera-based identification, facial or body part recognition, barcode, identification marks, etc.). When read by a suitable reading device, the ID device 12 returns a reading that includes at least a unique animal identifier, uniquely identifying the animal 10. When read by a suitable reading device (e.g. a tag reading device), the monitoring device 14 returns a reading that includes monitoring device identification information uniquely identifying the animal monitoring device 14 attached to the animal 10. It is to be noted that additional and/or alternative devices can be attached to the animal, and the ID device 12 and the monitoring device 14 are provided by way of non-limiting examples. As discussed, the animal 10 can be identified using various systems/devices/methods/techniques, including an ID tag, identification marks (e.g. digits, letters, symbols, or any combination thereof, etc.), readable barcodes, facial (or other body parts) recognition, etc., and that the animal 10 can be physiologically monitored using various monitoring devices, including a monitoring tag, a bolus, etc.

The assignment system may further include one or more reading devices 18. The reading devices 18 are capable of reading the devices attached to the animal 10, such as the ID device 12 and the monitoring device 14.

When looking at an example in which two tags are attached to the animal 10 (the ID device 12 is an ID tag and the monitoring device 14 is a monitoring tag), and assuming that both tags operate according to a common communication or tag reading protocol/technique, a single reading device 18 can read both the ID device 12 and the monitoring device 14. For example, if both the ID device 12 and the monitoring device 14 are Radio-Frequency (RF) tags, a single RF reading device can be used to read both tags. Similarly, if both the ID device 12 and the monitoring device 14 are Infra-Red (IR) tags, a single IR reading device can be used to read both tags. It is to be noted that when a single reading device 18 is used there is a need to discriminate between a reading from the ID device 12 and a reading from the monitoring device 14. This can be achieved in various known manners, including, for example, by having each tag designed and/or programmed to respond to a different stimulus from the reading device 18.

When looking at another example, in which there are still two tags attached to the animal 10 (the ID device 12 is an ID tag and the monitoring device 14 is a monitoring tag), however both tags operate according to different communication or tag reading protocols/techniques, each tag can be read by a different reading device 18 operating according to the respective communication protocol. For example, if the ID device 12 is an RF tag and the monitoring device 14 is an IR tag, the ID device 12 has to be read by an RF reading device and the monitoring device 14 has to be read by an IR reading device. It is to be noted that in some cases, a single tag reading device 18 can be able to communicate (or read) with different tags that operate according to different communication protocols or reading techniques (i.e. such tag reading device 18 has the ability to communicate with tags using multiple communication protocols, or reading techniques).

In some cases, the animal 10 can be identified without having an ID device 12 attached thereto. One example is visual identification (e.g. facial, or other body parts, recognition). In such cases, at least one of the reading devices 18 is a visual reading device such as a camera that acquires an image based on which the animal 10 is identified. In such cases, the monitoring device 14 may be an IR or RF tag for example, and the animal 10 is identified by visual identification while the monitoring device 14 is read by a device, or devices, that can read using the respective techniques or protocols.

It is to be further noted that in some cases, one or more of the identification methods may be passive identification methods, such as passive tags. For example, the tags can be a printing of a certain identifier on the animal 10, or they can be stickers of a certain visual identifier attached of the animal, or they can be markings painted on the animal. In such cases, where the tags are visually identifiable (e.g. barcodes), the respective tag reading device 18 can be, for example, a camera capable of acquiring images in the spectrum of the visual tags.

It is to be still further noted that the reading devices 18 have to be placed so that they can obtain readings that can be used to identify the animal 10 (e.g. by reading an ID device 12, or by any other identification method and/or technique) and read the devices (e.g. tags) attached to a single animal at a time. Placement of the reading devices 18 at a position in which due to their reading range they may simultaneously read devices attached to more than one animal may lead to errors in assignment of the devices (e.g. tags). For example, if two cows are within the reading ranges of the reading devices 18, the reading devices 18 will not be able to discriminate between the devices (e.g. tags) on each cow.

It is to be still further noted that the reading devices 18 have to be placed so that they can obtain readings that can be used to identify the animal 10 (e.g. by reading an ID device 12, or by any other identification method and/or technique) and read the devices (e.g. tags) attached to a single animal at a time. Placement of the reading devices 18 at a position in which due to their reading range they may simultaneously read devices attached to more than one animal may lead to errors in assignment of the devices (e.g. tags). For example, if two cows are within the reading ranges of the reading devices 18, the reading devices 18 will not be able to discriminate between the devices (e.g. tags) on each cow.

Accordingly, the reading devices 18 are placed so that they can obtain readings that can be used to identify the animal 10 (e.g. by reading an ID device 12, or by any other identification method and/or technique) and read the devices (e.g. tags) attached to the animal 10 when the animal is within a confined area 16. The confined area 16 is an area in which only a single cow can be located when the reading devices 18 read the devices (e.g. tags) attached to the animal.

In some cases, the reading devices 18 obtain readings that can be used to identify the animal 10 (whether using an ID tag or by any other means) and read the devices (e.g. tags) that are attached to the animal 10 substantially simultaneously. When reference is made herein to substantially simultaneously, one option is that the readings are made within a range of few seconds or even less than one second. Another option is that the readings are made during a time frame during which the animal 10 is expected to be located at the confined area 16 (for example, if the animal 10 is walking through an animal passage, and the readings are obtained while it is walking, it can be expected that the animal 10 will be located within the confined area 16 for less than a few seconds).

The confined area 16 can be, for example, at least part of feeding station in which a single animal is fed. Additionally, or alternatively, the confined area 16 can be at least part of milking cabin in which a single animal is milked. Additionally, or alternatively, the confined area 16 can be a portion of an animal passage allowing only one of the animals to be located within the confined area 16 during obtainment of readings that can be used to identify the animal 10 (e.g. by reading an ID device 12, or by any other identification method and/or technique) and the readings of the tags attached to the single animal by the reading devices 18. In some cases, the animal passage is a sorting gate.

In some cases, the animal passage comprises conductive rails. In some cases, these conductive rails may create the risk of interacting or interfering with the reading devices 18 operation. For example, the rails may act as an antenna that may conducts signals sent from the reading devices 18 to the devices (e.g. tags) attached to the animals outside the confined area 16, and/or the signals sent from the devices (e.g. tags) attached to the animals outside the confined area 16 in response to excitation by the reading devices 18. Thus, in some cases the reading devices 18 can be insulated from the conductive rails, e.g. using known methods and/or techniques.

It is to be noted that, in some cases, the confined area 16 may be limited to an area that covers the entire reading range of the reading devices 18, so that the tag reading devices 18 cannot obtain readings that can be used to identify animals that are located outside of the confined area 16 and/or readings of tags that are located outside s In some cases, as further detailed herein, inter alia with reference to FIG. 4, the animal 10 can be identified (e.g. by reading an ID device 12, or by any other identification method and/or technique) and the devices (e.g. tags) attached to the animal 10 can be read more than once, in order to verify that the identification and the obtained readings are accurate. In such cases, such subsequent reading/s can be made by the same reading devices 18, or they can be made by additional reading devices (not shown in the figure) that are also placed so that they can obtain readings that can be used to identify the animal 10 (e.g. by reading an ID device 12, or by any other identification method and/or technique) and read the devices (e.g. tags) attached to the animal 10 when the animal 10 is within a confined area, that can be the same confined area 16 shown in the figure, or another confined area that is not shown in the figure (e.g. another section of the animal passage).

Having described an example of part of the deployment of the system, attention is now drawn to FIG. 2. FIG. 2 is a block diagram schematically illustrating one example of a device assignment system, in accordance with the presently disclosed subject matter.

According to the presently disclosed subject matter, device assignment system 100 comprises one or more reading devices 18, each of which being capable of reading one or more devices (e.g. tags) attached to the animal 10. Due to the fact that the animal 10 can have a plurality of devices attached thereto, it can be appreciated that in those cases where two or more of the devices operate according to different communication or tag reading protocols/techniques, a plurality of reading devices 18 are required, so that the reading devices 18 include at least one reading device for each communication protocol/technique.

As indicated herein, one of the devices that can be attached to an animal 10 is an identification device 12 (e.g. an ID tag). In some cases, the animal 10 can be identified using non-tag based devices and systems, as described herein, such as, but not limited to, facial (or other body part) recognition techniques. In such cases, one or more other devices can be attached to the animal 10, and its identification can be non-tag based (e.g. facial, or other body-part, recognition).

Device assignment system 100 may further comprise a processing circuitry 120. Processing circuitry 120 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant device assignment system 100 resources and for enabling operations related to device assignment system's 100 resources.

Device assignment system 100 can further comprise a network interface 110 (e.g. a network card, a WiFi client, a LiFi client, 3G/4G client, or any other component), enabling device assignment system 100 to communicate over a network with various systems, such as a farm management system 140 in which animal records are kept (as further detailed herein), etc. It is to be noted that in some cases, the animal records are maintained in the device assignment system 100, and in such cases, the device assignment system 100 can optionally be a standalone system that does not have to communicate with an external farm management system 140.

Processing circuitry 120 comprises a device assignment module 130, configured to perform a device assignment process, as further detailed herein, inter alia with reference to FIGS. 3 and 4.

As indicated herein, one or more animal records are kept in a data repository 160. The device assignment system 100 is communicatively connected to the data repository 160. The data repository 160 can be an internal data repository comprised within the device assignment system 100, however it may also be an external data repository. In such cases, the data repository 160 can be part of a management system 140 (e.g. a farm management system), that the device assignment system 100 can communicate with (e.g. via its network interface 110).

In those cases where a management system 140 external to the device assignment system 100 exists, it can comprise a network interface 150 (e.g. a network card, a WiFi client, a LiFi client, 3G/4G client, or any other component), enabling management system 140 to communicate over a network with various systems, such as the device assignment system 100.

Management system 140 can further comprise, or be otherwise associated with, a data repository 160 (e.g. a database, a storage system, a memory including Read Only Memory-ROM, Random Access Memory-RAM, or any other type of memory, etc.) configured to store data, optionally including, inter alia, one or more animal records. Each animal record can be associated with a respective distinct animal and can include various types of information associated therewith, including a unique animal identifier associated with the respective distinct animal, and optionally information identifying one or more devices attached to the animal 10, as further detailed herein. Data repository 160 can be further configured to enable retrieval and/or update and/or deletion of the stored data. It is to be noted that in some cases, data repository 160 can be distributed, while the management system 140 has access to the information stored thereon, e.g. via a wired or wireless network to which management system 140 is able to connect (utilizing its network interface 150).

It is to be noted, as indicated herein, that in some cases the data repository 160 is internal to the device assignment system 100. In other cases, the data repository 160 can be comprised within the devices themselves, so that, for example, one or more of the devices that are attached to an animal 10 can include information identifying one or more other devices attached to the same animal 10, and/or information identifying the animal 10 itself. For example, the identification device 12 that is attached to the animal 10 can include a record comprising an identifier of the monitoring device 14 attached to the same animal 10. In those cases, those devices that include information identifying one or more other devices can be regarded as including their own data repository.

Having described the various components of the device assignment system 100, attention is drawn to FIG. 3, a flowchart illustrating one example of a sequence of operations carried out for device assignment, in accordance with the presently disclosed subject matter.

According to certain examples of the presently disclosed subject matter, device assignment system 100 is configured to perform a device assignment process 200, e.g. utilizing the tag assignment module 130. For this purpose, tag assignment system 100 is configured to obtain an animal identifier (e.g. by reading an ID device 12 such as an ID tag, or using any other identification method and/or technique) and one or more readings from one or more readings obtained by the reading devices 18 from the devices (e.g. tags) attached to the animal 10 (block 210).

In some cases, the obtainment of the animal identifier and of the readings obtained by the reading devices 18 from the devices (e.g. tags) attached to the animal 10 is performed substantially simultaneously, as detailed with reference to FIG. 1.

The animal identifier can be an ID reading of an animal identification device 12 (e.g. an ID tag) attached to a given animal 10, of a plurality of animals, from a reading device of the reading devices 18. In such cases, the ID reading includes at least information uniquely identifying the given animal 10. In other cases, the animal identifier can be obtained from any other device capable of uniquely identifying an animal 10 (e.g. using facial recognition methods and/or techniques).

The one or more readings obtained at block 210 may include a device reading of a device, other than the animal identification device 12, attached to the given animal 10 (e.g. an animal monitoring device 14 such as a monitoring tag). The device reading may be obtained from one of the reading devices 18. In such cases, the device reading includes at least device identification information uniquely identifying the device (e.g. the monitoring device 14) attached to the given animal 10.

As indicated herein, in case two devices are attached to the animal 10 (e.g. the ID device 12 and the monitoring device 14), and assuming that both devices operate according to a common communication protocol, a single reading device 18 can read both devices (while using known techniques for differentiating between the readings, as detailed herein with reference to FIG. 1). However, in case two devices are attached to the animal 10 (e.g. the ID device 12 and the monitoring device 14), however both devices operate according to different communication protocols, each device has to be read by a different reading device 18 operating according to the respective communication protocol (as detailed herein with reference to FIG. 1).

As indicated herein, it is to be noted that in some cases, the ID reading and the device reading are obtained when the given animal 10 is located at a confined area 16 as defined with reference to FIG. 1.

In some cases, device assignment system 100 can be configured to check if the readings failed (block 220), and in such case provide an alert to a user of the device assignment system 100 with a suitable indication (block 230). It is to be noted that a device reading can fail due to various reasons, including, for example, a malfunction of the device, a missing device (as in some cases devices, such as tags, can for example break and fall), etc.

Device assignment system 100 is further configured to cause update of the data repository 160 to assign the device identification information to a given record of the records associated with the unique animal identifier of the given animal 10 (block 240). By doing so, the data repository 160 is automatically updated to indicate that the device identified by the device identification information is attached to the animal 10 that is identified by the obtained animal identifier.

It is to be noted that in some cases, a device that is attached to the animal 10 may be removed (for any reason) from another animal before attachment to the animal 10. Due to the fact that the device was attached to another animal, the data repository 160 may indicate that such device is assigned to such other animal. Accordingly, device assignment system 100 can be further configured to cause another update of the data repository 160 to delete the device identification information from a second record of the records, other than the given record, wherein the second record is not associated with the unique animal identifier of the given animal (block 250).

It is to be noted that in some cases, all, or part, of the device assignment process 200, can be performed by the management system 140, in cooperation with the tag assignment system 100 or by itself.

It is to be further noted, with reference to FIG. 2, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Turning to FIG. 4, there is shown another flowchart illustrating another optional part of the sequence of operations carried out for device assignment, in accordance with the presently disclosed subject matter.

According to certain examples of the presently disclosed subject matter, as part of the device assignment process 200, after performance of block 210 or block 220, device assignment system 100, can be configured to again obtain a second animal identifier and one or more second readings from one or more of the reading devices 18 (block 310). The second animal identifier and the one or more second readings obtained at block 310 can be obtained from the same origin (e.g. from the same reading devices 18), at different points in time, or from other origins (e.g. other reading devices) simultaneously, or at different points in time.

In some cases, the obtainment of the second animal identified and of the second readings is performed substantially simultaneously, as detailed with reference to FIG. 1.

The second animal identifier can be an ID reading of an animal identification device 12 (e.g. an ID tag) attached to the given animal 10, from a reading device of the tag reading devices 18. In such cases, the second ID reading includes at least information uniquely identifying the given animal 10. In other cases, the animal identifier can be obtained from any other device capable of uniquely identifying an animal 10 (e.g. using facial recognition methods and/or techniques).

The one or more readings obtained at block 310 include a second device reading of the device attached to the given animal 10 that is not an animal identification to device g 12 (e.g. an animal monitoring device 14, such as a monitoring tag). The second device reading is obtained from one of the reading devices 18. In such cases, the second device reading includes at least device identification information uniquely identifying the second device attached to the given animal 10.

As indicated herein, it is to be noted that in some cases, the ID reading and the device reading are obtained when the given animal 10 is located at the confined area 16 as defined with reference to FIG. 1, or at another confined area (e.g. another part of the animal passage) that meets the same requirements of a confined area as defiled with reference to FIG. 1.

After obtainment of the information at block 310, the device assignment system 100 can be configured to check if the readings match (block 320). That is, the device assignment system 100 is configured to verify that (a) the unique animal identifier included in the second ID reading obtained at block 310 is identical to the unique animal identifier included in the ID reading obtained at block 210, and (b) that the device identification information included in the second readings obtained at block 310 is identical to the device identification information included in the device readings obtained at block 210.

In case of a mismatch, the device assignment system 100 can be configured to perform an action, such as provide a notification to a user of the device assignment system 100, mark the animal to be checked, etc. (block 330). In case no mismatch exists, the device assignment process 200 can proceed to block 220 or 240, so that the causing of the update of the data repository is performed only in case of a match between the values of the readings (identical animal identifier and identical device identification information).

It is to be noted, with reference to FIG. 4, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed methods. The presently disclosed subject matter further contemplates a machine-readable memory tangibly embodying a program of instructions executable by the machine for executing the disclosed methods.

The invention claimed is:

1. A tag assignment system, comprising:
one or more tag reading devices capable of reading tags attached to animals; and
a processing circuitry;
wherein:
(a) the tag assignment system is communicatively connected to a data repository comprising one or more records, each of the records being associated with a respective distinct animal of a plurality of animals, and including a unique animal identifier associated with the respective distinct animal; and
(b) the processing circuitry is configured to:
obtain a first ID reading of an animal identification tag attached to a given animal of the animals from a first tag reading device of the tag reading devices, wherein the first tag reading device is operating according to a first communication protocol, and the first ID reading including at least the unique animal identifier uniquely identifying the given animal, and substantially simultaneously, in respect to the time of the first ID reading, obtain a first tag reading of a second tag, other than the animal identification tag, attached to the given animal from a second tag reading device of the tag reading devices, wherein the second tag reading device is operating according to a second communication protocol, wherein the animal identification tag is a Radio Frequency Identification (RFID) tag and the first communication protocol is an RFID protocol, the second tag is an Infra-Red (IR) tag and the second communication protocol is an IR protocol, the first tag reading including at least tag identification information uniquely identifying the second tag attached to the given animal;
obtain at least one additional readings set of ID and Tag readings, each additional readings set is obtained by: obtaining a second ID reading of the animal identification tag attached to the given animal—from at least one third tag reading device of the tag reading devices, wherein the third tag reading device operating according to the first communication protocol, the second ID reading including at least the unique animal identifier uniquely identifying the given animal, and obtain a second tag reading of the second tag attached to the given animal from a fourth tag reading device of the tag reading devices, wherein the fourth tag reading device is operating according to the second communication protocol, and the second tag reading including at least the tag identification information uniquely identifying the second tag attached to the given animal; and
upon the first ID reading being identical to the second ID reading and upon the tag identification information of the first tag reading being identical to the tag identification information of the second tag reading, of at least one of the additional readings sets, cause update of the data repository, at least to assign the tag identification information to a given record of the records associated with the unique animal identifier of the given animal.

2. The tag assignment system of claim 1, wherein the processing circuitry is further configured to cause a second update of the data repository to delete the tag identification information from a second record of the records, other than the given record, wherein the second record is not associated with the unique animal identifier of the given animal.

3. The tag assignment system of claim 1, wherein the second tag is an animal monitoring tag.

4. The tag assignment system of claim 1, wherein the first communication protocol is different than the second communication protocol.

5. The tag assignment system of claim 1, wherein the first tag reading device is different than the second tag reading device.

6. The tag assignment system of claim 1, wherein the ID reading and the tag reading are obtained when the given animal is located at a confined area, so that (a) the animal identification tag is within a first reading range of the first tag reading device, and (b) the second tag is within a second reading range of the second tag reading device.

7. The tag assignment system of claim 6, wherein the confined area is: (a) within a feeding station, (b) within a milking cabin, (c) a portion of an animal passage allowing only one of the animals to be located within the confined area during obtainment of the ID reading and the tag reading, or (d) is an area defined by the first reading range and the second reading range.

8. The tag assignment system of claim 6, wherein the animal passage comprises conductive rails, and wherein at least one of (a) the first tag reading device, or (b) the second tag reading device, are insulated from the conductive rails.

9. The tag assignment system of claim 1, wherein the processing circuitry is further configured to alert a user upon failure to obtain the ID reading or the tag reading.

10. The tag assignment system of claim 1, wherein the first ID reading and the first tag reading are performed at a different time point in respect to the timing of the ID reading and the tag reading of the at least one additional reading set.

11. A tag assignment method, comprising:
obtaining a first ID reading of an animal identification tag attached to a given animal of the animals from a first tag reading device of one or more tag reading devices capable of reading tags attached to animals, wherein the first tag reading device is operating according to a first communication protocol, and the first ID reading including at least the unique animal identifier uniquely identifying the given animal, and substantially simultaneously, in respect to the time of the first ID reading, obtaining a first tag reading of a second tag, other than the animal identification tag, attached to the given animal from a second tag reading device of the tag reading devices, wherein the second tag reading device is operating according to a second communication protocol, wherein the animal identification tag is a Radio Frequency Identification (RFID) tag and the first communication protocol is an RFID protocol, the second tag is an Infra-Red (IR) tag and the second communication protocol is an IR protocol, and the first tag reading including at least tag identification information uniquely identifying the second tag attached to the given animal; and
obtaining at least one additional readings set of ID and tag readings, each additional reading set is obtainable by: obtaining a second ID reading of the animal identification tag attached to the given animal from a third tag reading device of the tag reading devices, wherein the third tag reading device is operating according to the first communication protocol, and the second ID reading including at least the unique animal identifier uniquely identifying the given animal, and substantially simultaneously, in respect to the time of the second ID reading, obtaining a second tag reading of the second tag attached to the given animal from a fourth tag reading device of the tag reading devices, wherein the fourth tag reading device is operating according to the second communication protocol, and the second tag reading including at least the tag identification information uniquely identifying the second tag attached to the given animal; and upon the first ID reading being identical to the second ID reading and upon the tag identification information of the first tag reading being identical to the tag identification information of the second tag reading, of at least one of the additional readings sets, causing update of a data repository comprising one or more records, each of the records (i) being associated with a respective distinct animal of a plurality of animals, and (ii) including a unique animal identifier associated with the respective distinct animal, wherein the update includes at least assigning the tag identification information to a given record of the records associated with the unique animal identifier of the given animal.

12. The tag assignment method of claim 11, further comprising causing a second update of the data repository to delete the tag identification information from a second record of the records, other than the given record, wherein the second record is not associated with the unique animal identifier of the given animal.

13. The tag assignment method of claim 11, wherein the second tag is an animal monitoring tag.

14. The tag assignment method of claim 11, wherein the first communication protocol is different than the second communication protocol.

15. The tag assignment method of claim 11, wherein the first tag reading device is different than the second tag reading device.

16. The tag assignment method of claim 11, wherein the ID reading and the tag reading are obtained when the given animal is located at a confined area, so that (a) the animal identification tag is within a first reading range of the first tag reading device, and (b) the second tag is within a second reading range of the second tag reading device.

17. The tag assignment method of claim 11, wherein the confined area is: (a) within a feeding station, (b) within a milking cabin, (c) a portion of an animal passage allowing only one of the animals to be located within the confined area during obtainment of the ID reading and the tag reading, or (d) is an area defined by the first reading range and the second reading range.

18. The tag assignment method of claim 11, further comprising alerting a user upon failure of obtaining the ID reading or the tag reading.

19. A non-transitory computer readable storage medium having computer readable program code embodied therewith, the computer readable program code, executable by at least one processing circuitry of a computer to perform a method comprising:

obtaining a first ID reading of an animal identification tag attached to a given animal of the animals from a first tag reading device of one or more tag reading devices capable of reading tags attached to animals, wherein the first tag reading device is operating according to a first communication protocol, and the first ID reading including at least the unique animal identifier uniquely identifying the given animal, and substantially simultaneously, in respect to the time of the first ID reading, obtaining a first tag reading of a second tag, other than the animal identification tag, attached to the given animal from a second tag reading device of the tag reading devices, wherein the second tag reading device is operating according to a second communication protocol, wherein the animal identification tag is a Radio Frequency Identification (RFID) tag and the first communication protocol is an RFID protocol, the second tag is an Infra-Red (IR) tag and the second communication protocol is an IR protocol, and the first tag reading including at least tag identification information uniquely identifying the second tag attached to the given animal; and obtaining at least one additional readings set of ID and tag readings, each additional reading set is obtainable by: obtaining a second ID reading of the animal identification tag attached to the given animal from a third tag reading device of the tag reading devices, wherein the third tag reading device is operating according to the first communication protocol, and the second ID reading including at least the unique animal identifier uniquely identifying the given animal, and substantially simultaneously, in respect to the time of the second ID reading, obtaining a second tag reading of the second tag attached to the given animal from a fourth tag reading device of the tag reading devices, wherein the fourth tag reading device is operating according to the second communication protocol, and the second tag reading including at least the tag identification information uniquely identifying the second tag attached to the given animal; and upon the first ID reading being identical to the second ID reading and upon the tag identification information of the first tag reading being identical to the tag identification information of the second tag reading, of at least one of the additional readings sets, causing update of a data repository comprising one or more records, each of the records (i) being associated with a respective distinct animal of a plurality of animals, and (ii) including a unique animal identifier associated with the respective distinct animal, wherein the update includes at least assigning the tag identification information to a given record of the records associated with the unique animal identifier of the given animal.

20. The tag assignment method of claim 11, wherein the first ID reading and the first tag reading are performed at a different time point in respect to the timing of the ID reading and the tag reading of the at least one additional reading set.

* * * * *